Dec. 25, 1973   G. H. ERB   3,781,398
HOOK FASTENER ELEMENT AND METHOD OF MANUFACTURE
Filed May 11, 1972   2 Sheets-Sheet 1
FIG. 1
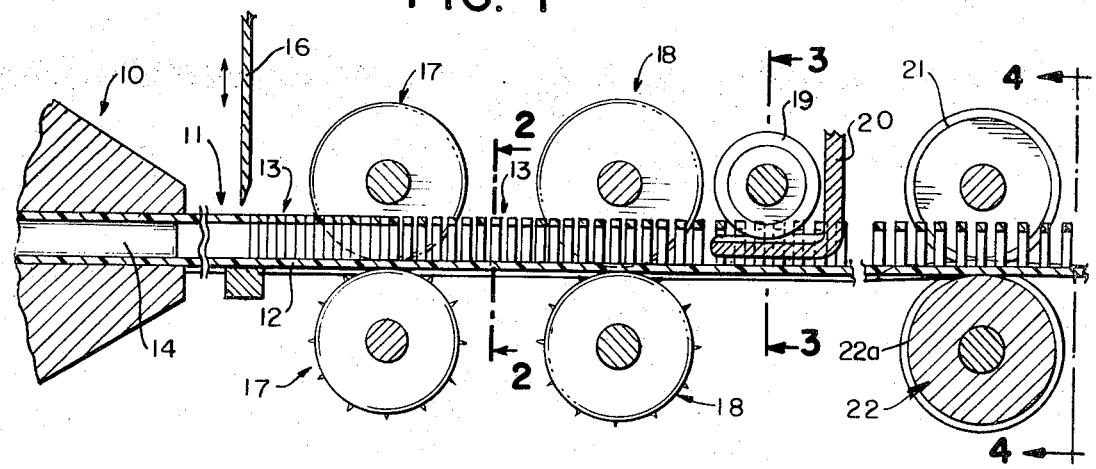
FIG. 2
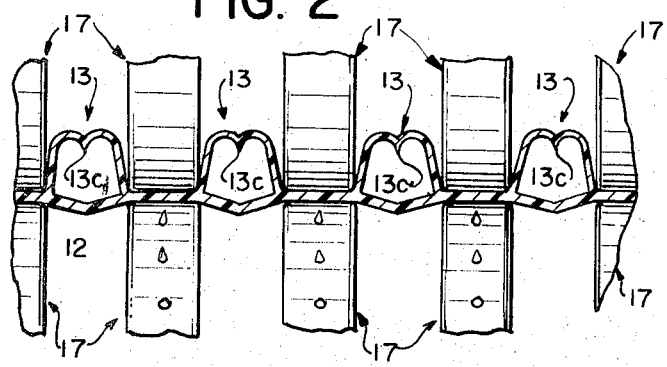
FIG. 3
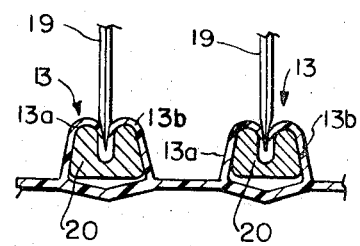
FIG. 4
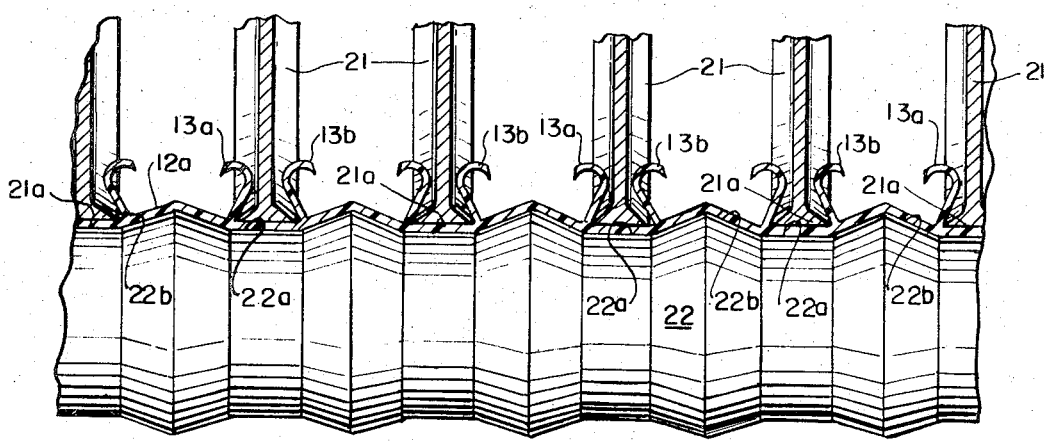
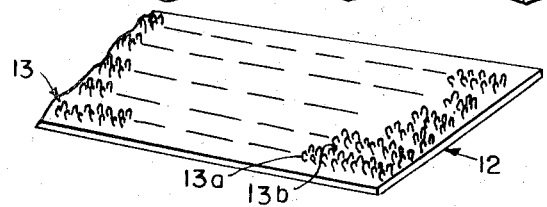
FIG. 5

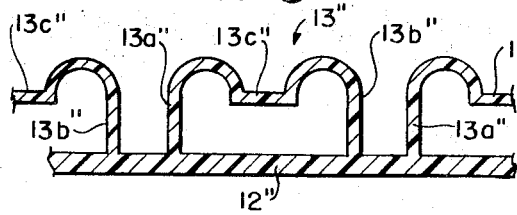
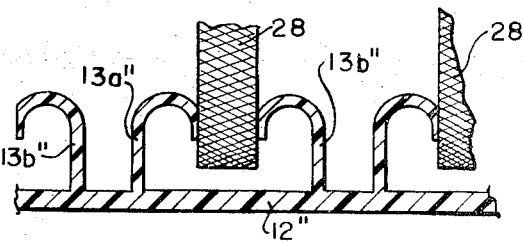
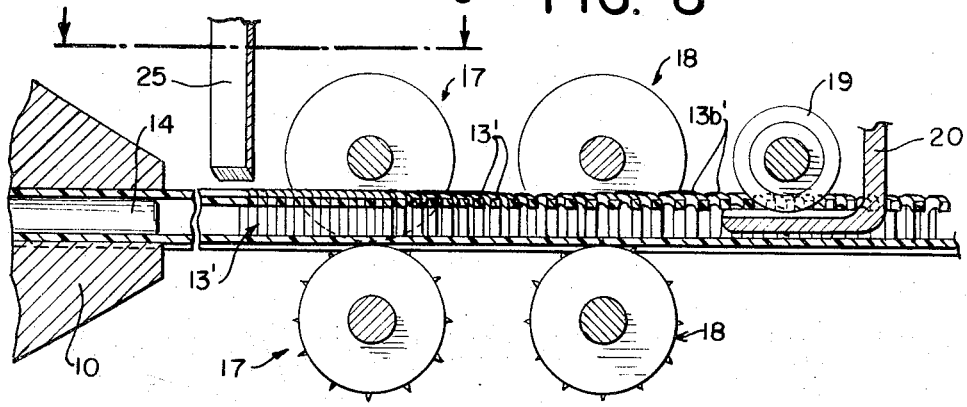
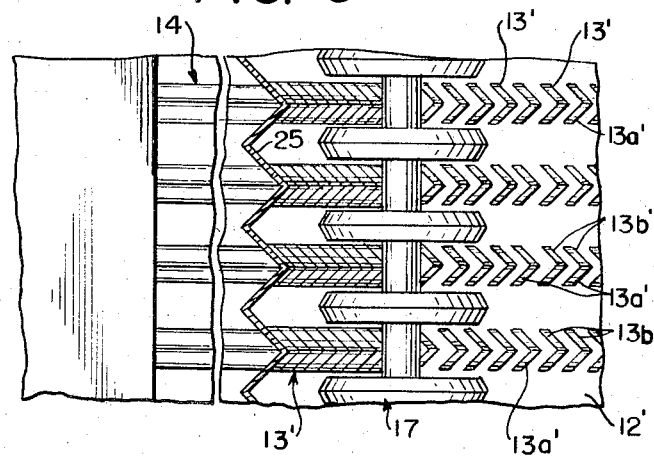
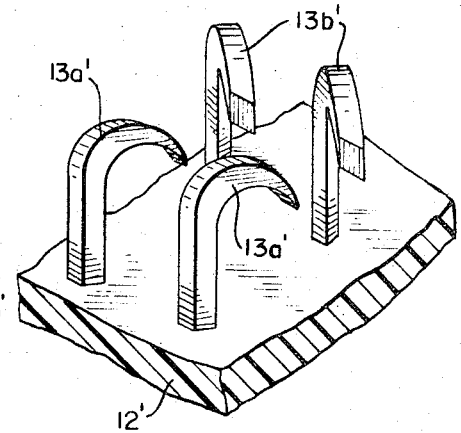

though only examples of the invention.

United States Patent Office 3,781,398
Patented Dec. 25, 1973

3,781,398
HOOK FASTENER ELEMENT AND
METHOD OF MANUFACTURE
George H. Erb, Rutland, Vt., assignor to
American Velcro, Inc.
Filed May 11, 1972, Ser. No. 252,239
Int. Cl. B28b 11/16; B29d 5/00
U.S. Cl. 264—146                           10 Claims

ABSTRACT OF THE DISCLOSURE

A hook fastener element formed from extruded stock having a base sheet and adjacent longitudinally arranged parallel members of generally heart-shaped cross section integrally connected to said base and apparatus and method for forming hooks from said extruded stock.

BACKGROUND OF THE INVENTION

Hook and loop fastener members have become well known where the loop fastener element consists essentially of a base strip with a plurality of looped pile upstanding therefrom, and the mating hook fastener elements are made generally from converting rows of loops into hooks by cutting. The present invention concerns the manufacture of the latter element, i.e. the hook fastener element of the hook and loop combination. The manufacture of hook fastener elements can be quite expensive particularly if the method entails conversion of woven loop pile into hooks. This is because the loop pile must be woven very uniformly, then heat set prior to cutting of the loops to form hooks. It is the purpose of the present invention to disclose a novel hook fastener element which is made entirely from extruded base material and which is less expensive than the described prior method of manufacture.

SUMMARY OF THE INVENTION

In accordance with the present invention, a novel hook fastener product and its method of manufacture is provided, together with the apparatus for manufacture, wherein an extruded workpiece is first formed comprising generally a flat base sheet to which it integrally attached a plurality of hollow, longitudinally arranged elongated members comprising opposing hooklike forms joined at the center of said members. Means are provided for cutting the longitudinal members transversely and for thereafter stretching the base sheet to separate each cut segment or section longitudinally. Cutting means separates the centers of each section and in one form of the invention, means are provided for spacing apart the two halves of the section to form adjacent opposing hook forms. In another form of the invention, the adjacent hook portions of each segment are joined at their centers by a strip which is removed by cutting, leaving thereby spaced apart opposing hook forms.

BRIEF DESCRIPTION OF THE DRAWING

FIG. 1 is a side elevation view partly in cross section of an apparatus for manufacturing hook fastener elements according to the present invention;

FIGS. 2, 3 and 4 are cross sections taken respectively along lines 2—2, 3—3 and 4—4 of FIG. 1;

FIG. 5 is a fragmentary schematic illustration of the product produced by the present invention;

FIGS. 6 and 7 are cross sections showing an alternative form of the invention;

FIG. 8 is similar to FIG. 1 showing an apparatus for producing a modified form of hook fastener element;

FIG. 9 is a cross section taken along lines 9—9 of FIG. 8; and

FIG. 10 is a perspective view of the modified hook fastener element produced by the apparatus of FIG. 8.

DESCRIPTION OF PREFERRED EMBODIMENTS

Referring to the drawing and initially to FIGS. 1–5, reference 10 designates an extrusion die capable of extruding a workpiece 11 of the desired configuration therefrom. As best seen in FIG. 2, the workpiece 11 consists of a base sheet 12 to which are integrally attached a series of longitudinally arranged elongated members 13 which may be said to be generally heartshaped in cross section. Respective halves of members 13 are sections 13a and 13b joined at a common center 13c. Beneath each of the members 13, the base sheet 12 is formed downwardly as a symmetrical ridge as shown while between each member 13 the sheet is straight.

Referring to FIG. 1, as each of the members 13 are extruded from the die 10, they are extruded over a mandrels 14. Thereafter upon emerging from the die orifice, the members 13 are slit transversely by a cyclic or reciprocating knife 16. After transverse slitting two pairs of godet wheels 17 and 18 driven at different speeds, stretch the base sheet 12 so that members 13 become separated for a short distance, for instance, the thickness of each member. Next, as seen in FIGS. 1 and 3, a circular rotating knife 19 slits longitudinally through the juncture of opposing halves 13a, 13b of each member 13. Prior to and during this slitting operation, the mandrel 20 is inserted within each member 13 to hold these members securely.

After longitudinal slitting by knife 19, the sheet 12 passes between opposing rollers 21 and 22. As will be seen with respect to FIG. 4 each of the rollers 21 has a flattened outer perimeter 21a which forms a nip with the flattened perimeter 22a of the roller 22, between which the straight sections of sheet 12 between adjacent members 13 pass and are held securely. Immediately adjacent to the engaging portions of rollers 21 and 22, roller 22 is formed with ridges 22b which are opposite in direction to the downwardly protruding ridges 12a of the backing sheet 12. In the process of passing through rollers 21 and 22 therefore, the downwardly protruding sections 12a shown in FIG. 2 will be thrust in an opposite direction so as to force apart the hook-like projections 13a, 13b. It will be understood that since the material of sheet 12 is at this point only recently extruded from die 10, it will be possible, by passing the sheet 12 through the rollers 21 and 22 in the manner described, at the same time to force sections 13a, 13b apart while straightening the downward projections 12a. In other words, after the sheet 12 has passed through rollers 21 and 22, the sheet 12 will be substantially straight and sections 13a and 13b will be spaced apart as opposing hooks. FIG. 5 illustrates the product of the foregoing steps i.e. the hook portion of a hook and loop type fastener.

Referring to FIG. 8, a variation of the arrangement of FIG. 1 has been illustrated. In the embodiment of FIG. 8, the cyclic knife 25 has a herringbone shape as shown in FIG. 9. Thus, angled sections 13' are first cut and then stretched by godet wheels 17 and 18. Circular knife 19 separates the junctures of each section 13' in the manner described in connection with FIG. 1. Thereafter, the herringbone configuration of FIGS. 8 and 9 is treated to the steps disclosed and described in connection with FIGS. 2–4; that is to say, the hook-like projections 13a', 13b' will be formed in the same manner as described in connection with the product of FIGS. 1–4, except that as shown in FIG. 10, the hooks thus formed will be formed at a converging angle with respect to each other.

Referring to FIGS. 6 and 7, a third embodiment of the invention has been illustrated. In this embodiment, the base sheet 12″ is extruded in an entirely straight condition, that is, without ridges beneath heart-shaped section 13″. Each of the sections 13″ includes a center section 13c″ which connects hook-like side sections 13a″ and 13b″. The extruded workpiece will first be transversely slit by the cyclic knife 16 and stretched longitudinally between godet wheels 17 and 18. Then, as seen in FIG. 7, a rotary cutter 28 removes each of the center sections 13c″ to leave spaced apart opposing hook sections.

The invention provides a simple, inexpensive mass production technique for the manufacture of hook tape suitable for use in hook and loop fasteners. It will be understood that variations from what has been described may be made without departing from the essence of the invention. Therefore, in order to appreciate the invention's scope, reference should be made to the appended claims.

What is claimed is:

1. The method of manufacturing the hooked portion of a hook and loop fastener comprising the steps of extruding a base sheet of plastic material to which is integrally attached at least one hollow longitudinal member comprising opposing hooklike forms joined at the center of said member, transversely slitting said member into relatively thin upright sections joined to said base sheet, stretching said base sheet longitudinally to separate said sections and cutting said sections longitudinally to separate respective halves thereof into opposing hooklike projections.

2. The method according to claim 1 wherein a plurality of members is arranged in side by side relation.

3. The method according to claim 1 wherein said base sheet is straight throughout and the halves of said member are joined at the center by a section which spaces said halves apart and said cutting step removes said center section.

4. The method according to claim 1 wherein said base sheet beneath each member extends away from said member, and the step is provided of straightening the base sheet after longitudinal cutting to cause the opposing hooklike halves of said member to move apart.

5. The method according to claim 2 wherein said members are slit transversely in a herringbone pattern.

6. The method according to claim 5 wherein said base sheet beneath each member extends away from said member, and the step is provided of straightening the base sheet after longitudinal cutting to cause the opposing hooklike halves of said member to move apart.

7. Apparatus for manufacturing the hooked portion of hook and loop fastener comprising means for extruding a base sheet of plastic material and at least one hollow longitudinal member shaped to have opposing hooklike forms joined at the center of member, means for slitting said member transversely to form separate sections upstanding from said base sheet, means for longitudinally stretching said base sheet to separate said sections, and means for cutting the center of said sections to form hooklike members.

8. Apparatus according to claim 7 wherein means are provided for spacing apart respective opposing hooklike members.

9. Apparatus according to claim 8 wherein said base sheet is deformed outwardly between opposing ones of said hooklike members and said means for spacing said hooklike members comprises roller means for straightening the deformation to cause said opposing hooklike members to move apart.

10. The apparatus according to claim 7 wherein said transverse slitting means is shaped to angularly orient said hooklike members.

References Cited

UNITED STATES PATENTS 3,655,855  4/1972  Brumlik  264—148

FOREIGN PATENTS 1,463,693  12/1966  France  425—814

DOUGLAS J. DRUMMOND, Primary Examiner

U.S. Cl. X.R.

264—150; 425—301, 305, 328, 814